Figure 1:
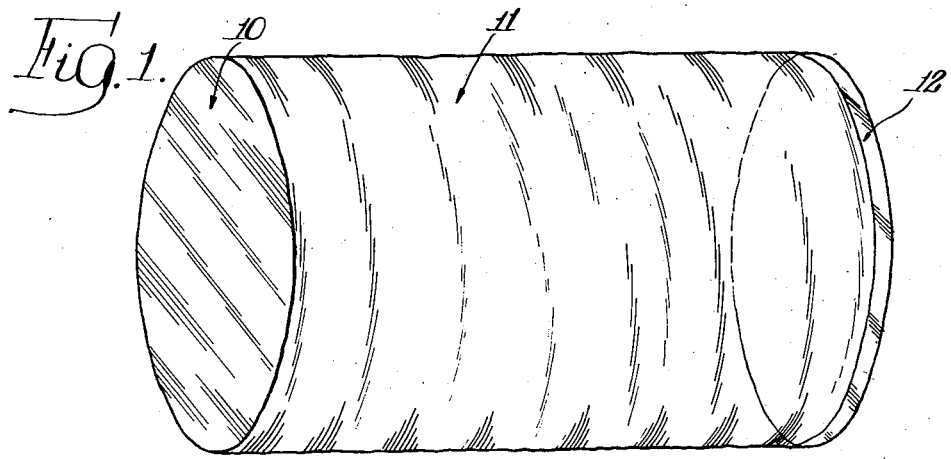

Aug. 13, 1957 E. E. ELLIES 2,802,743
MEAT PACKAGE AND METHOD OF PREPARING SAME
Filed April 10, 1953 2 Sheets-Sheet 1

INVENTOR.
Ernest E. Ellies,
BY

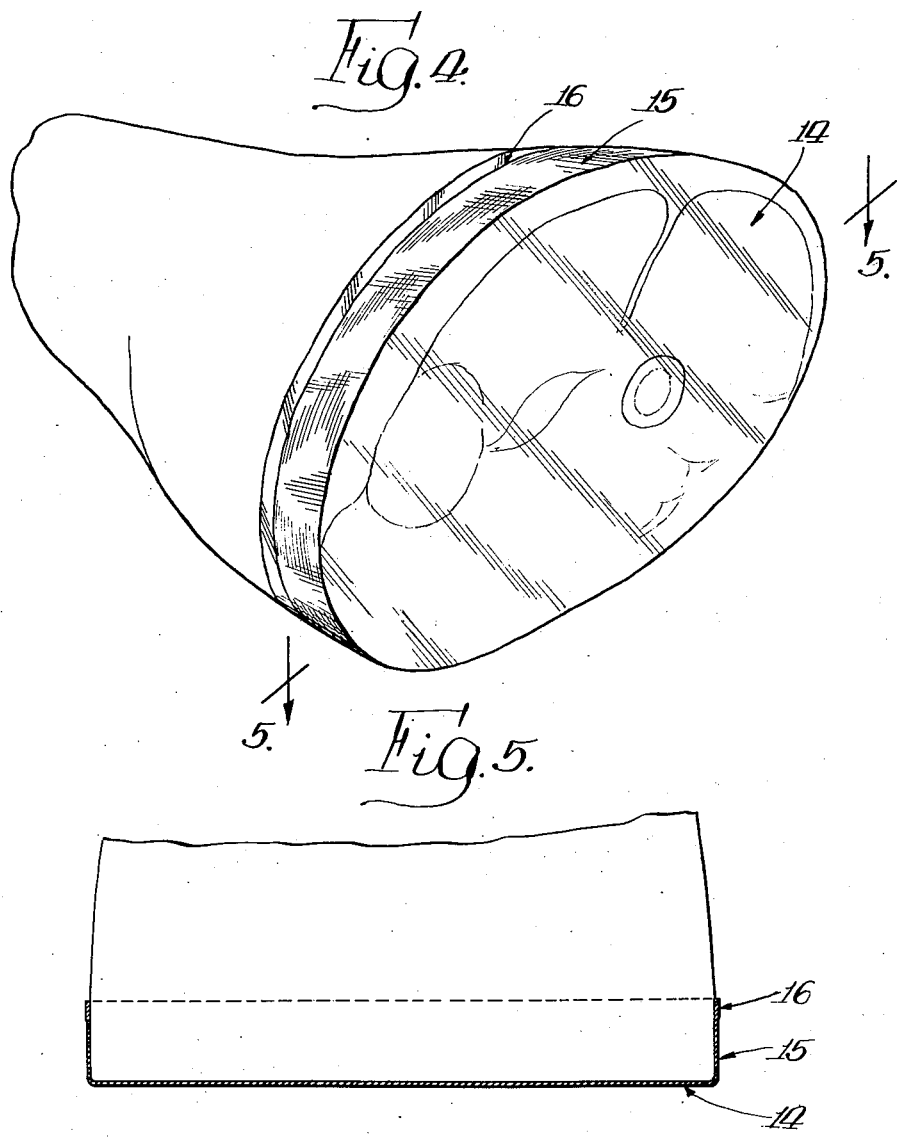

United States Patent Office 2,802,743
Patented Aug. 13, 1957

2,802,743

MEAT PACKAGE AND METHOD OF PREPARING SAME

Ernest E. Ellies, Chicago, Ill., assignor to Tee-Pak, Inc., a corporation of Illinois Application April 10, 1953, Serial No. 348,028

3 Claims. (Cl. 99—174)

This invention relates to a plastic film envelope or wrapper which is specially adapted for packaging of various items. In the one modification the invention more particularly relates to a plastic film product which is especially suitable as a tight fitting covering intimately contacting all surfaces of the mass being wrapped and in a second modification the invention contemplates a plastic wrapper which is especially suitable as a tight fitting covering for a planar or nearly planar surface of wrapped or encased materials which surface has been exposed due to slicing or severing of portions of the larger wrapped bulk.

In the production of certain packaged items in general and particularly in the wrapping of foodstuffs such as cheeses, meats, meat emulsions and the like which are subject to dehydration, discoloration and similar spoilage, it is essential that the encasing material be of such nature that it can snugly conform to the contour of the material. This close conformity is attainable only with considerable difficulty in the situation wherein the wrapped material is pear-shaped or cylindrical in form, for example. Equally involved in the problem of wrapping is the problem of preventing distortion of the transparent wrapper so that there will be no interference with visual examination of the contents.

Many film-forming transparent plastic materials having thermoplastic properties have been employed in the packaging of foodstuffs in general and particularly in the wrapping of meats, meat emulsions and the like. It is a particular advantage in this type of film that upon heating and stretching—said stretching being maintained during cooling—the film can be stabilized in a strained molecular arrangement which arrangement will upon heating relieve itself of the strain and contract to approximately its original size and shape. The suitability of such plastic materials for general wrapping applications is incidentally further enhanced by the fact that they can be dyed by conventional methods known in the film-casting art.

The thermoplastic property of these materials has made them particularly adaptable to the encasing of the aforesaid meats and meat products in which application the materials can be heat-shrunk to closely contact the encased contents. Such a physical nature enables these plastic materials such as rubber hydrochloride and polyvinyl chloride and others to snugly contact the wrapped material and, within certain limits, to closely conform to the contour of the contents. Such conformity is inherently advantageous in that it minimizes or prevents dehydration, discoloration, and similar spoilage; in the more general applications such conformity greatly improves the appearance of the package.

However, it can be seen that such a two-dimensional shrinkage of the plastic film has a deleterious effect in certain situations wherein a cylindrical or elongated chunk of material is to be wrapped. Here the shrinkage deforms the edge of the end or face portion and in related ways distorts any printed legends and the like on the end or face-contacting portion of the film and interferes with visual examination of the contents.

The aforementioned second embodiment of my invention relates to a partial envelope or wrapper adapted to protect exposed faces of materials and foodstuffs which have been cut into smaller pieces for handling and merchandising. In this respect it will have its most useful applications at the retail level of food distribution, but will have, of course, wider usage wherever materials which have been encased during processing must be cut into smaller portions. Such is the situation which exists, for example, in the merchandising of hams which must be reduced in size to meet consumer demand for less than an entire ham. This demand appears in the form of requests for half a ham or for select center slices. A similar situation exists in the case of encased meat emulsions such as bologna and the like. It is readily apparent that in these situations the merchandiser, having divided the encased foodstuffs and having sold only a portion thereof, is left with a partially uncovered section, or sections, which on exposure to the air will be subject to dehydration, discoloration and similar spoilage.

Accordingly, it is an object of this invention to provide novel means for producing a superior packaged item.

It is a further object of this invention to provide a plastic film wrapper for blocks, chunks, and cylindrically shaped material, all surfaces being uniformly contacted by the wrapper.

Another object of this invention is to provide a plastic film wrapper for blocks, chunks, and cylindrically shaped objects which contains no distortion in the film surface contacting the end of said cylindrical chunk.

A further object of the invention is to provide a plastic film wrapper for chunks of foodstuffs which wrapper will not because of distortion interfere with visual examination of the encased foodstuffs.

A still further object of the invention is to provide a thermoplastic transparent film wrapper for cylindrical chunks of foodstuffs which wrapper can carry an undistorted printed legend on the end or planar face portion of the film.

It is a further object of this invention to provide means for covering the exposed surface of the contents of opened packages of pre-wrapped or naturally covered materials.

A further object of the invention is to provide means for covering the exposed surface of opened packaged materials which means are conveniently stored and easily applied.

In the objects above described and in the particular applications to be subsequently discussed it is to be borne in mind that the exact shape of the mass or of the face portion to be wrapped is not critical. Therefore references to cylindrically shaped objects are to be considered as being equally pertinent to block and bulb-shaped articles, roughly cylindrical forms, and ellipsoidal masses.

Figure 2:
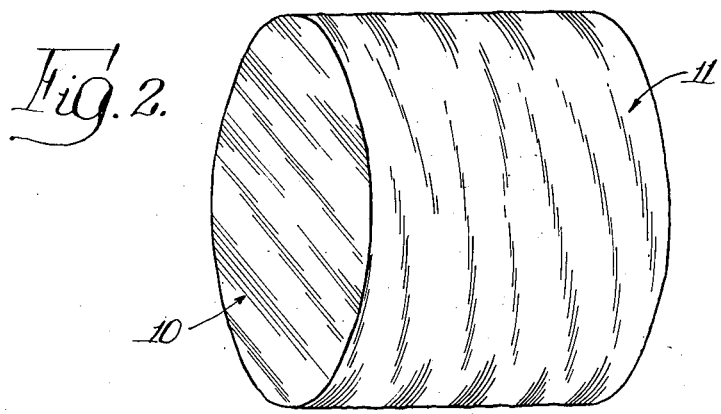
Figure 3:
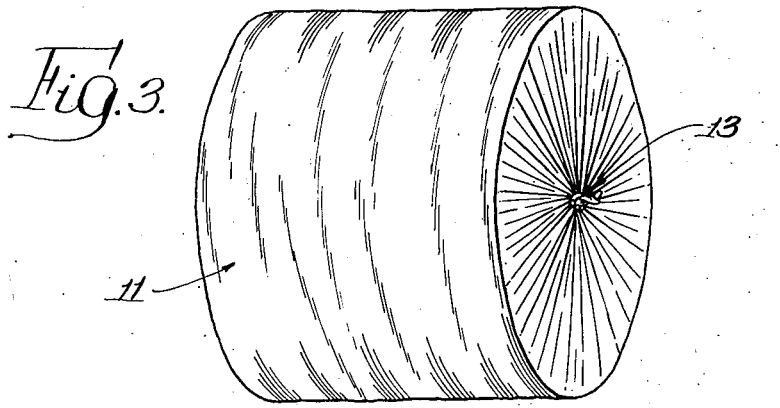

For completely covering such objects or foodstuffs articles, I have devised a "cup" which can be readily applied and perfectly fitted without any alteration of the shape of the article. This result has been achieved by a "cup" of transparent plastic material, represented in Fig. 1, which consists of a planar or approximately planar portion 10 contacting an end or face, and turned peripheral edges 11 which contact the sides and remaining portions of the material as shown in Fig. 2. These turned peripheral edges also permit a sealing of the wrapper by conventional methods such as stapling 13 on the end opposite to the face portion as shown in Fig. 3.

For covering an exposed surface of a packaged or naturally encased material, I have devised a modification of the described complete wrapper which is a partial envelope or "cup" which can be conveniently stored until needed, can be easily applied without special equipment, and can be perfectly fitted to produce a complete sealing of the foodstuffs. This "cup" which is represented in Fig. 5 consists of a planar portion 14 and has turned peripheral edges 15 which contact the sides of the foodstuffs at points adjacent the exposed end or face, as shown in Fig. 4.

In fabricating such a "cup" a sheet of the chosen thermoplastic material, such as rubber hydrochloride, polyvinyl chloride and other similar pliable thermoplastic film products, of any conventional film thickness, such as from approximately 1 to 2½ mils in the case of rubber hydrochloride, is heated to the point of softness. The heated film is then fitted over a female die of suitable size and shape and the sheet is then shaped by a flat-ended male die which stretches the film. After this shaping operation the film is held in the die while the film cools so that an aligned crystalline structure is produced in the film. This structural alignment is a strained or unnatural one which is, however, stable at ordinary temperatures. But as has been explained above, the strained condition is alleviated by subsequent heating to softness at which time the film contracts to its original size.

By employing a flat-ended male die a planar surface of unoriented film is produced in the "cup" bottom. This bottom or face is not stretched and therefore remains unoriented. It is this unoriented face portion that permits a uniformly snug fit on both the end and side portions of the wrapped article. Moreover, this uniformly intimate wrapping is not achieved at the expense of mutilated edges in the final product. And furthermore there is no distortion of the wrapper in either the end or side portions of the film.

That portion of the film extending beyond the edges of the die can be trimmed by any of the methods known in the film casting art so as to leave a band of unoriented film best shown as elements 12 and 16 in Figs. 1 and 4, respectively, which band, because of its unstrained molecular arrangement, provides a strong edge serving as a handhold in wrapping operations.

In applying the envelope to the surface to be covered, the edge including an oriented portion of the film is pulled over the edge of the planar foodstuffs surface and beyond the opposite end of the article being wrapped to permit a complete sealing. At this closure end the "cup" can be fastened by stapling or by heat sealing according to known methods. The application of heat to the peripheral portion of the thus formed package results in shrinking these film surfaces and driving out the air to provide a skin-tight article.

In the case of the partial wrapper, it passes over the same edge far enough to allow the oriented portion to make contact with the wrapper or natural casing on the foodstuffs article as originally packaged. Having placed the oriented portion in contact with the naturally hardened exterior or with the original casing or packaging material such as regenerated cellulose casing, the strain produced in the film upon orientation can be relieved by heating to cause shrinkage of the film. In the pictured embodiment of this modification the turned edge portion of the "cup" or envelope can be quickly heated by passing a suitable heat source along its edge. It thereupon contracts, driving out the air, and produces a "shrink fit" covering which tightly contacts the natural or encased sides of the foodstuffs to produce an airtight closure. Where it is deemed a desirable and necessary precaution an adhesive coating may be spread upon the turned edges which adhesive will further insure a complete closure. The use of such adhesive is not, however, a requisite since the nature of these plastic film materials is such that the degree of shrinkage attainable by heating techniques alone effectuates a suitable sealing.

Although I have pictorially presented envelopes having a planar surface as especially applied to bologna chunks or ham halves and the like, it is to be understood that the face portion of the plastic envelope could, within limits, be molded or pre-shaped without orientation of the film to make the covering of this invention conform to other like surfaces such as the large end of a bulb-shaped mass or the convex face of an ellipsoidal form to which it would be applied.

It is therefore evident that I have by this means provided in the first modification a complete wrapper uniformly contacting the encased object without distortion of the film wrapper or mutilation of the contents. By the second modification I have provided a particlularly feasible way of protecting the exposed portions of opened pre-packaged or naturally encased foodstuffs. The film wrappers can be used for packaging, in addition to the heretofore mentioned articles, such materials as fruits including pears, apples, oranges and the like, fresh produce such as cucumbers and peppers, and irregularly shaped products such as random cuts of cheese, hardware items and the like.

Having thus described my invention, what I claim is:

1. A method of preparing a meat package comprising selectively heating and stretching a portion of a plastic film to render said portion oriented while maintaining a predetermined area of said film adjacent said oriented portion in unoriented condition, applying the resulting film structure about a chunk of food having a planar surface so that the unoriented portion of said film covers the said planar surface, and the oriented portion conforms to the sides of said chunk, and then heating said oriented portion to form a skin-tight covering on said meat chunk.

2. A package comprising a chunk of food having a planar surface, in combination with a cylindrical cup of plastic film having an unoriented bottom portion preshaped to that of the planar surface of said chunk and oriented sidewalls, said sidewalls on being heated to the point of softness making intimate contact with the sides of said chunk to provide a skin-tight covering.

3. A meat package comprising a chunk of meat having a planar surface, in combination with a cylindrical cup of plastic film having an unoriented bottom portion preshaped to that of the planar surface of said meat chunk and oriented sidewalls, said sidewalls on being heated to point of softness making intimate contact with the sides of said meat chunk to provide a skin-tight covering.

References Cited in the file of this patent

UNITED STATES PATENTS

| 1,105,986 | McKenzie | Aug. 4, 1914 |
| 1,471,729 | Guinzburg | Oct. 23, 1923 |
| 1,668,716 | Herdman | May 8, 1928 |
| 1,826,593 | Azamber | Oct. 6, 1931 |
| 1,995,750 | Salley | Mar. 26, 1935 |
| 2,168,651 | McCoy | Aug. 8, 1939 |
| 2,385,257 | Cavallito | Sept. 18, 1945 |
| 2,438,901 | Coxe | Apr. 6, 1948 |
| 2,487,400 | Tupper | Nov. 8, 1949 |
| 2,490,250 | Boener | Dec. 6, 1949 |
| 2,565,316 | Lucas et al. | Aug. 21, 1951 |
| 2,645,818 | Drisch et al. | July 21, 1953 |

FOREIGN PATENTS

| 426,788 | Great Britain | Apr. 5, 1935 |

OTHER REFERENCES

"Food Industries," August 1940, pp. 42 and 43.
"Modern Packaging," September 1950, pp. 93 and 94.